Aug. 5, 1969    K. WILFERT    3,459,067
DRIVE UNIT ARRANGEMENT IN AUTOMOTIVE VEHICLES
Filed Oct. 6, 1966    2 Sheets-Sheet 1

INVENTOR
KARL WILFERT

BY *Dicke & Craig*
ATTORNEYS

Aug. 5, 1969  K. WILFERT  3,459,067
DRIVE UNIT ARRANGEMENT IN AUTOMOTIVE VEHICLES
Filed Oct. 6, 1966  2 Sheets-Sheet 2

INVENTOR
KARL WILFERT
BY *Dicke + Craig*
ATTORNEYS

United States Patent Office 3,459,067
Patented Aug. 5, 1969

3,459,067
DRIVE UNIT ARRANGEMENT IN AUTOMOTIVE VEHICLES
Karl Wilfert, Gerlingen-Waldstadt, Germany, assignor to Daimler-Benz Aktiengesellschaft, Stuttgart-Unterturkheim, Germany
Filed Oct. 6, 1966, Ser. No. 584,739
Claims priority, application Germany, Oct. 6, 1965, D 48,364, D 48,365
Int. Cl. F16h 37/06
U.S. Cl. 74—661      18 Claims

ABSTRACT OF THE DISCLOSURE

The automotive internal combustion engine has an output shaft angularly intersecting the central longitudinal vertical plane of the vehicle to provide a space saving arrangement wherein the weight is balanced with respect to the central plane.

Background of the invention

In automotive vehicles, the motors or drive units are normally provided with their cylinders in an upright or horizontal position, or may also be inclined with respect to the horizontal plane of the bottom of the vehicle. In this connection, in spite of the disposition of the cylinders, the drive shaft of the motor is commonly located in the longitudinal central plane of the vehicle, or is positioned in parallel thereto so as to extend rearwardly from the motor mounted at the front of the vehicle to the differential and rear driven wheels. This arrangement of the drive unit and drive shaft consumes a large amount of space and does not permit optimum utilization of the space available in the automotive vehicle.

In the previously known motor arrangements for motor vehicles, it is also customary to provide the auxiliary assemblies necessary for operating the motor and other vehicle accessories, such as the generator, starter, fuel pump, oil pump, and the like, at different places along the motor or drive unit, with the particular arrangement being made preferably in accordance with space-saving considerations. However, such arrangement has the disadvantage that the auxiliary assemblies are often placed in positions which are accessible only with great difficulty when repairs must be made.

Summary of the invention

The invention therefore is based in part on the solution of this problem through provision of an extremely space-saving and yet very efficient drive unit arrangement. This problem is solved according to the present invention by providing the drive unit or units with their motor shafts at right angles, or at a certain angle, to the vertical longitudinal central plane of the vehicle. With this arrangement, two or more drive units can be arranged in pairs located oppositely to each other, and the drive unit or units can be provided, in such an arrangement, at approximately the center of the vehicle. However, it is also possible, when putting the concept of the invention into practice, to place the drive unit or units on one side of the longitudinal central plane of the vehicle; while on the opposite side, the clutch can be provided, if desired, together with an intermediate member, such as a transmission or other part, which may serve simultaneously as a weight balancing means.

Particularly in case of a low-positioned drive axle, the drive unit or units can be arranged at an angle to the longitudinal central plane of the vehicle and additionally obliquely to the horizontal plane of the bottom of the vehicle. A very advantageous solution is also attained, in the just-described construction of the invention, if the drive units are provided at an angle to both the horizontal and vertical vehicle planes so as to form a V-shaped position.

The invention serves to overcome this problem by arranging the auxiliary assemblies as conveniently as possible, so that they are readily accessible for maintenance purposes, and at the same time are positioned in a space-saving manner. This problem is solved, according to the invention, by combining the auxiliary assemblies associated with the motor or drive unit, such as the generator, starter, fuel pump, oil pump, and if desired with the inclusion of the ventilators and/or the clutch, and the like, to a structure unit, preferably being attached to an auxiliary gear box, or support structure for the various devices. In this connection, the auxiliary gear box can be provided at the gear housing of the drive unit, or also at a different location, for example, at the crankcase. The auxiliary gear box can advantageously be arranged in such a manner that a more favorable weight balance is attained for the overall combination.

A particularly space-saving and easily accessible provision of the drive unit with an auxiliary gear box is achieved when the drive unit is provided as previously described with its drive shaft, at right angles or at a certain angle to the vertical longitudinal central plane of the vehicle and such an arrangement greatly facilitates the efficient positioning of the auxiliary equipment.

Likewise an arrangement in accordance with the invention wherein the auxiliary gear box is separately supported from the drive unit, preferably in a fully elastic manner, and is connected via an equalization coupling with the shaft driven by the drive unit is very suitable.

It is a principal object of the present invention to provide a drive unit arrangement for motor vehicles which entirely eliminates or at least materially avoids all of the disadvantages inherent in known arrangements of a similar nature.

It is another object of the present invention to provide a drive unit arrangement for motor vehicles which make optimum use of the space available in the motor vehicle.

It is a further object of the present invention to provide a drive unit arrangement for motor vehicles which provides for economic use of space while effecting an especially favorable distribution of the weight of the drive unit and auxiliary units in the vehicle.

It is still another object of the present invention to provide a drive unit arrangement for motor vehicles which provides for economic use of space while also making possible accessible location of auxiliary equipment deriving power from the drive unit.

It is still a further object of the present invention to provide a drive unit arrangement of the type described which provides for simplification and improvement in the disposition and accessibility of drive unit elements and units attendant thereto.

Brief description of the drawing

These and other objects, features and advantages of the present invention will become more apparent from the following detailed description of the invention when taken in conjunction with the accompanying drawings, which illustrate several embodiments of the present invention, and wherein.

Detailed description of the drawing

Figure 1:
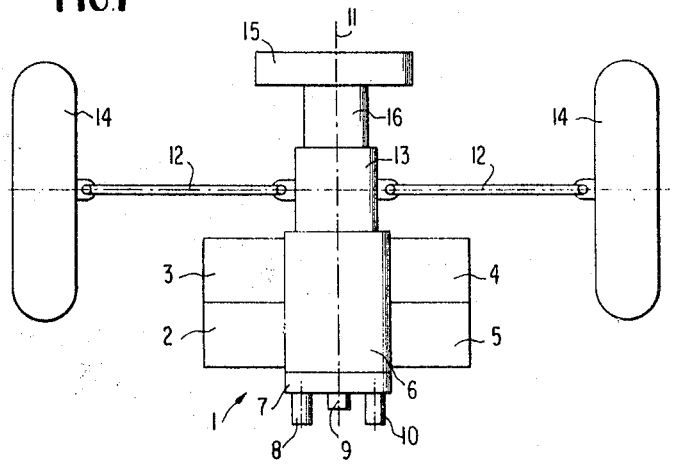
FIGURE 1 shows a drive unit consisting of a four-cylinder engine, arranged in a horizontal position, with an auxiliary gear box.

Referring now more particularly to the drawings, wherein like reference numerals have been used to designate like elements throughout the various views wherever possible, FIGURE 1 shows a drive unit consisting essentially of the engine 1 having four cylinders 2 to 5 associated with crankcase 6, for example, containing twin bevel gears or other arrangement of known configuration, and an auxiliary gear box 7 carrying the additional assemblies 8, 9 and 10, for example, the generator, starter, fuel pump, oil pump, or the like. The auxiliary gear box being connected to the drive unit by detachable fastener means. While the power unit in FIG. 1 is provided with four horizontally disposed cylinders 2 to 5, it should be understood that this power unit may also consist of four cylinder blocks, each having a plurality of vertically disposed cylinders. The drive unit 1 is arranged symmetrically to the vertical longitudinal central plane of the vehicle 11, in front of the wheel axles 12, and is directly connected with the differential 13, from which the axles 12 extend to the wheels 14 in the well-known manner. Behind the wheel axles 12, the clutch 15, and the gear-shift or transmission system 16 are arranged in a weight-balancing manner, providing for substantially equal distribution of weight on either side of the wheel axles 12.

Figure 2:
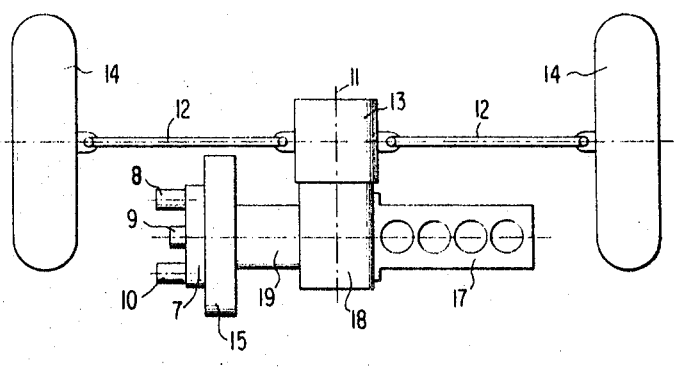
FIGURE 2 shows a drive unit with an auxiiary gear box, arranged laterally of the longitudinal central plane of the vehicle.

As shown in FIGURE 2, a very efficient space-saving arrangement of a drive unit 17 with an auxiliary gear box 7 can be attained by providing the drive unit 17 with the auxiliary gear box 7 at right angles to the longitudinal central plane of the vehicle 11. In this embodiment of the invention, the drive unit 17 is arranged on the right-hand side, and the auxiliary gear box 7 on the left-hand side of the bevel gear box or housing 18, which serves for transmitting and guiding the force emanating from the drive unit 17 to a longitudinal shaft (not shown) to the differential 13 under control of a clutch 15 and transmission 19. Thereby, a very good weight balance is accomplished on either side of the vehicle longitudinal central plane, which is even further improved by the provision of the auxiliary assemblies 8, 9 and 10 along with the clutch 15 and the intermediate transmission member 19 on the left-hand side of the bevel gear 18.

Figure 3:
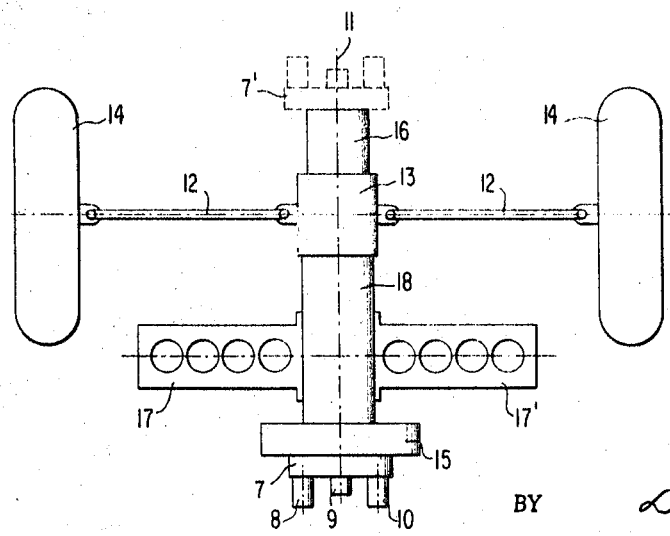
FIGURE 3 shows two drive units with an auxiliary gear box, provided at right angles to the longitudinal central plane of the vehicle.

FIGURE 3 shows another embodiment having two drive units 17 and 17', these units being provided transverse to and on either side of the longitudinal plane 11 of the vehicle. The drive units 17 and 17', whose cylinders represented schematically by circles are in an upright position, are connected to a bevel gear housing 18 which serves for transmitting the force from the drive units to the other portions of the engine arrangement via a longitudinal shaft (not shown). The auxiliary assemblies 8 to 10 necessary for operating both drive units are combined into a unit on an auxiliary gear box 7, the latter being mounted to the front wall of the bevel gear housing 18, the clutch 15 being interposed between the housing 18 and the gear box 7. The transmission system 16 is provided, in a weight-balancing manner, on the other side of the wheel axles 12 at the differential 13. This provision of the transmission 16 on the opposite side of the wheel axles 12 from the drive units 17 and 17' and the clutch 15 serves as a means of providing a substantially equal distribution of weight on either side of the wheel axles. Weight balance and accessible positioning of auxiliary equipment is also provided by positioning the equipment 8, 9 and 10 along with the gear box 7 at the end of the arrangement on the clutch 15. The transmission and transfer of engine power can be accomplished in the above-described arrangement of the gears, the clutch and the like, by means of hollow tubular shafts or by means of parallel-positioned shafts.

The illustration of the auxiliary gear box 7' in dashed lines in FIGURE 3 indicates that the auxiliary gear box 7 can also be provided at the gear-shift system 16 for further improving the weight balance on either side of the wheel axles 12.

Figure 4:
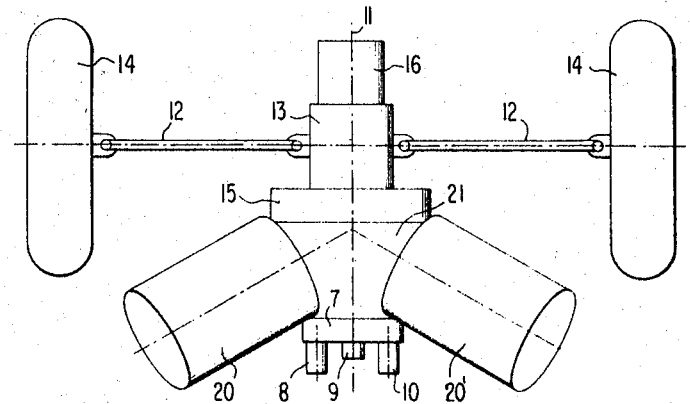
FIGURE 4 shows the auxiliary gear box in a drive unit arrangement with two "Wankel" (rotary piston) engines.

FIGURE 4 shows a particularly favorable, space-saving embodiment of this invention. In this embodiment, two "Wankel" (rotary piston) engines 20, 20' are mounted in driving relationship on a bevel gear housing 21; these engines extend obliquely upwardly and are aligned at an angle to the longitudinal central plane 11 of the vehicle so as to be in V-position with respect to each other, thereby providing an especially advantageous spacing of the elements. The auxiliary gear box 7 carrying the additional assemblies 8 to 10, which are necessary for the operation of the rotary piston engines 20 and 20', is coupled to the bevel gear housing 21. Between the differential 13 and the bevel gear housing 21, the clutch 15 is mounted. On the other side of the wheel axles 12 from the drive unit, the transmission system 16 is attached to the differential 13 so that it serves as a weight balance providing equal distribution of weight on either side of the wheel axles.

Figure 5:
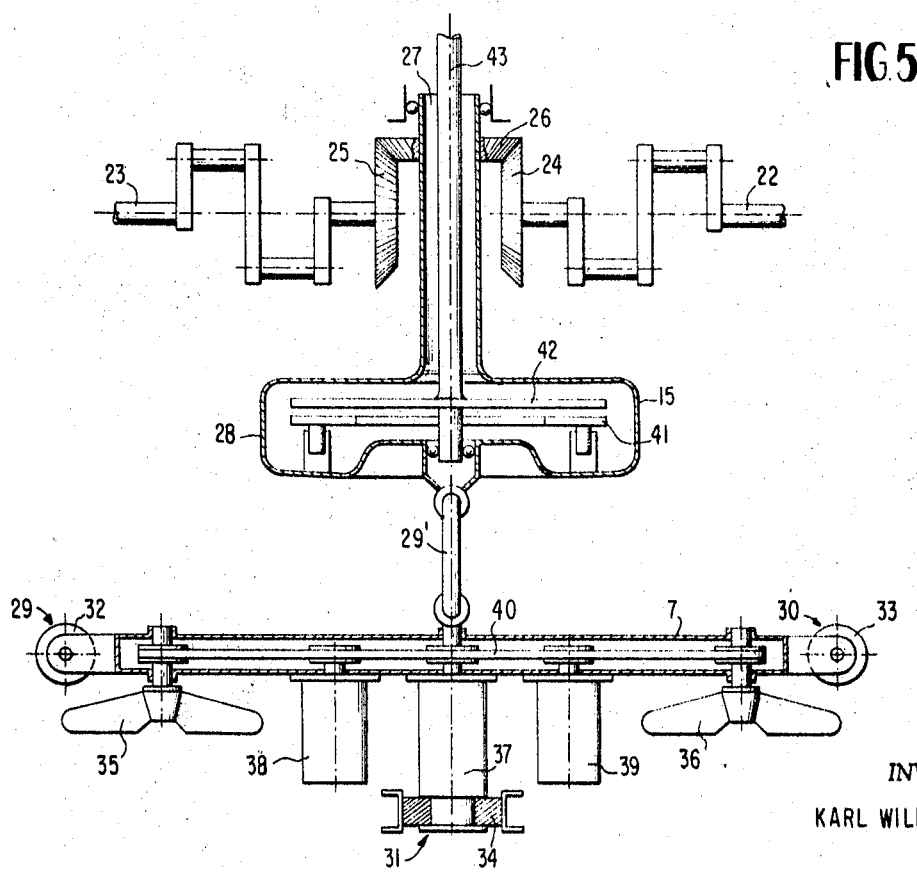
FIGURE 5 shows the arrangement and construction of an auxiliary gear box mounted separately from the drive unit.

In FIGURE 5, the drive of the auxiliary assemblies by a driven unit, as illustrated in FIGURE 3, is shown in a schematic view. However, in contrast to FIGURE 3, the auxiliary gear box 7 is not directly attached to the clutch 15, but is elastically mounted separately from the drive units. At the crankshafts 22 and 23 of the two drive units, for example, units 17 and 17', of FIGURE 3, bevel gears 24 and 25 are provided which engage with a third bevel gear 26, all included in gear housing 18. This third bevel gear 26 is secured upon a hollow shaft 27, the latter being directly connected with the housing 28 of the clutch 15. Thus, the clutch housing 28 rotates at the same speed of rotation as the hollow shaft 27 driven by the drive units 17 and 17'. An equalization coupling 29' provides a connection between the clutch housing 28 and the auxiliary gear box 7 mounted separately from the engine and gear assemblies. The auxiliary gear box 7 is supported elastically at the three points 29, 30 and 31 by interposition of rubber blocks 32–34 at the vehicle body or superstructure. At the auxiliary gear box 7, the starter 38, the fuel pump 39, and the like, are provided. The individual additional assemblies 35–39 are driven via a V-belt 40. Within the clutch 15, there is an annular friction disc 41 secured to housing 28 and a full friction disc 42 secured to drive shaft 43. The drive units are connected via the clutch 15 and the drive shaft 43 to the transmission system where driving power is applied through the differential to the wheel axles in the well known manner.

While I have shown and described several embodiments in accordance with the present invention, it is understood that the same is not limited thereto but is susceptible of numerous changes and modifications as known to a person skilled in the art. For example, as is apparent from the above description, any type of drive unit, having horizontal, vertical or angularly disposed cylinders, either of the linear piston, rotary piston or other type of motor, may be utilized in combination with known bevel gear arrangements, transmissions, differential gear arrangemnets, clutches, and the like. I therefore do not wish to be limited to the details shown and described herein, but intend to cover all such changes and modifications as are encompassed by the scope of the appended claims.

I claim:

1. A passenger automotive motor vehicle with a drive unit arrangement, comprising: axle means having driven wheels; a change-speed transmission; a differential drivingly connected directly between said change-speed transmission and said axle means; power means including at least one internal combustion engine power unit and an engine output shaft drivingly connected to said change-speed transmission; said engine output shaft being mounted for rotation about an axis extending at an angle with respect to and intersecting the central vertical longitudinal plane aligned with the direction of driving; auxiliary gear box means, including a fuel pump, an oil pump, a generator and the like, for supporting operation of said power unit, and detachable fastener means for mounting said auxiliary means as a unit in connection with said power unit.

2. A drive unit arrangement as defined in claim 1 wherein said power means includes at least two power units positioned oppositely to one another on either side of said vertical longitudinal vehicle plane.

3. A drive unit arrangement as defined in claim 1 further including a clutch drivingly interposed between said transmission and said power unit; said unit being disposed on the opposite side of said vertical longitudinal vehicle plane from said transmission so as to substantially equalize the weight of said drive unit on either side of said plane.

4. A drive unit arrangement as defined in claim 3 wherein said transmission is disposed between said clutch and said power unit transversely to said vertical longitudinal vehicle plane.

5. A drive unit arrangement as defined in claim 1 wherein said drive unit is oblique to a horizontal vehicle plane as well as said vertical longitudinal vehicle plane.

6. A drive unit arrangement as defined in claim 1 wherein said gear box means being positioned with respect to said power means so as to effect a substantial equalization of weight on either side of a vertical vehicle plane.

7. A drive unit arrangement as defined in claim 1 wherein said gear box means is rigidly connected to said power unit.

8. A drive unit arrangement as defined in claim 7, wherein said transmission is connected to said differential on the opposite side thereof from said power means and said gear box means.

9. A drive unit arrangement as defined in claim 8 further including a clutch interposed between said power means and said differential.

10. A drive unit arrangement as defined in claim 1 wherein said power means further includes a clutch connected between said power means and said gear box means.

11. A drive unit arrangement as defined in claim 10 wherein said power means includes at least two power units, each positioned on a respective side of the central longitudinal vertical vehicle plane.

12. A drive unit arrangement as defined in claim 10 wherein said power means and said clutch are aligned in a vehicle transverse plane.

13. A drive unit arrangement as defined in claim 12 further including said transmission interposed between said clutch and said power unit.

14. A drive unit arrangement as defined in claim 11 wherein said transmission is connected to said power means on the opposite side thereof from said clutch and said gear box means.

15. A drive unit arrangement as defined in claim 1 wherein, said gear box means being coupled to said differential on the opposite side thereof from said power unit.

16. A drive unit arrangement as defined in claim 15 wherein said transmission is connected between said gear box means and said differential.

17. A drive unit arrangement as defined in claim 1 wherein said power means is substantially aligned in a vehicle transverse plane.

18. A drive unit arrangement as defined in claim 1 wherein said gear box means is mounted separately from said power means in a resilient manner, and equalizing coupling means interconnecting said gear box means and said power means.

References Cited

UNITED STATES PATENTS

| | | | |
|---|---|---|---|
| 1,466,394 | 8/1923 | Fornaca | 74—661 |
| 1,563,405 | 12/1925 | Schlumberger | 74—661 |
| 1,583,407 | 5/1926 | Macalpine | 74—410 |
| 2,380,889 | 7/1945 | Waseige | 74—661 X |
| 2,609,707 | 9/1952 | Marchant | 74—661 |
| 3,077,074 | 2/1963 | Collman et al. | 60—39.16 X |
| 3,266,248 | 8/1966 | Leslie | 60—39.16 |
| 3,271,949 | 9/1966 | Jones et al. | 60—39.16 |
| 2,238,615 | 4/1941 | Wolf | 180—54 |
| 2,448,345 | 8/1948 | Aronson | 74—701 X |
| 2,913,927 | 11/1959 | Issigonis | 74—701 |
| 3,327,556 | 6/1967 | Blavette | 74—701 |
| 3,363,413 | 1/1968 | Jones et al. | 60—39.16 |

ARTHUR T. McKEON, Primary Examiner

U.S. Cl. X.R.

74—665